United States Patent
Iyengar et al.

(10) Patent No.: US 7,673,108 B2
(45) Date of Patent: Mar. 2, 2010

(54) METHODS AND SYSTEMS FOR DISTRIBUTED CACHING IN PRESENCE OF UPDATES AND IN ACCORDANCE WITH HOLDING TIMES

(75) Inventors: Arun Kwangil Iyengar, Yorktown Heights, NY (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1488 days.

(21) Appl. No.: 10/995,601

(22) Filed: Nov. 23, 2004

(65) Prior Publication Data

US 2005/0071569 A1 Mar. 31, 2005

Related U.S. Application Data

(62) Division of application No. 10/092,766, filed on Mar. 7, 2002, now Pat. No. 6,871,268.

(51) Int. Cl.
*G06F 12/00* (2006.01)
(52) U.S. Cl. .................. 711/163; 711/118; 711/141; 711/167

(58) Field of Classification Search .................. None
See application file for complete search history.

(56) References Cited

U.S. PATENT DOCUMENTS 6,640,268 B1 * 10/2003 Kumar .................. 710/46

OTHER PUBLICATIONS

"Computer Architecture: A Quantitative Approach" by J. Hennessy and D. Patterson, 2nd ed., 1996.
P. Rodriguez, C. Spanner and E. Biersack, "Web Caching Architectures: Hierarchical and Distributed Caching," Proceedings of the 4th International Web Caching Workshop, Mar. 1999.
"Improving Performance with Application-Level Caching" by L. Degenaro, A. Iyengar, and I. Rouvellou, Proceedings of SSGRR 2001.

* cited by examiner

*Primary Examiner*—Reginald G Bragdon
*Assistant Examiner*—Shawn X Gu
(74) *Attorney, Agent, or Firm*—Preston J. Young; Ryan, Mason & Lewis, LLP

(57) ABSTRACT

Techniques for cache management including cache replacement are provided. In one aspect, a distributed caching technique of the invention comprises the use of a central cache and one or more local caches. The central cache communicates with the one or more local caches and coordinates updates to the local caches, including cache replacement. The invention also provides techniques for adaptively determining holding times associated with data storage applications such as those involving caches.

5 Claims, 4 Drawing Sheets

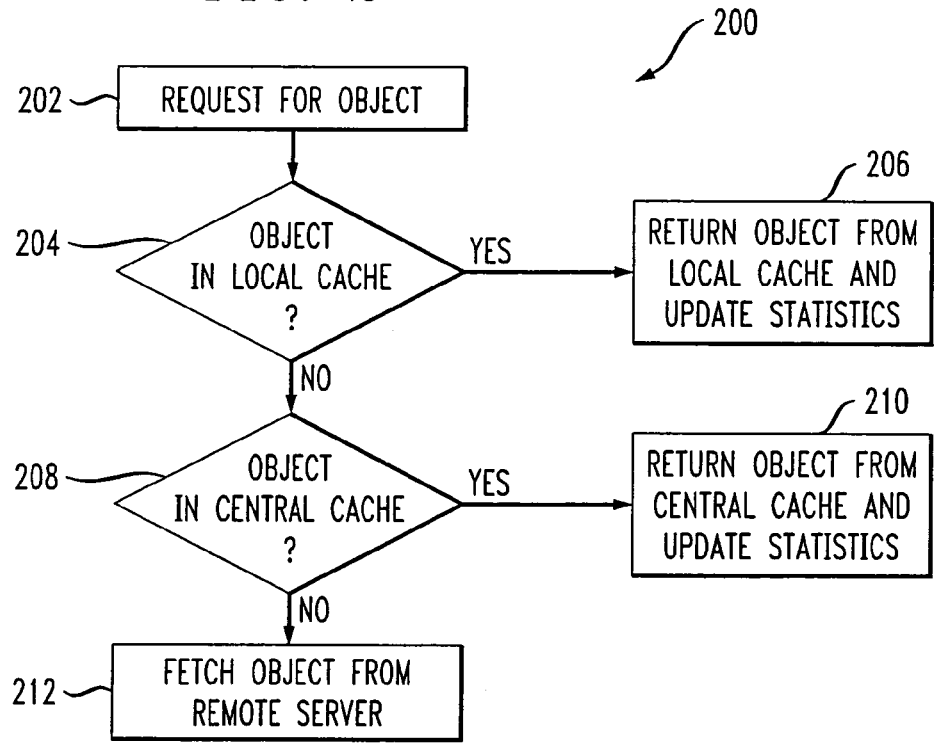
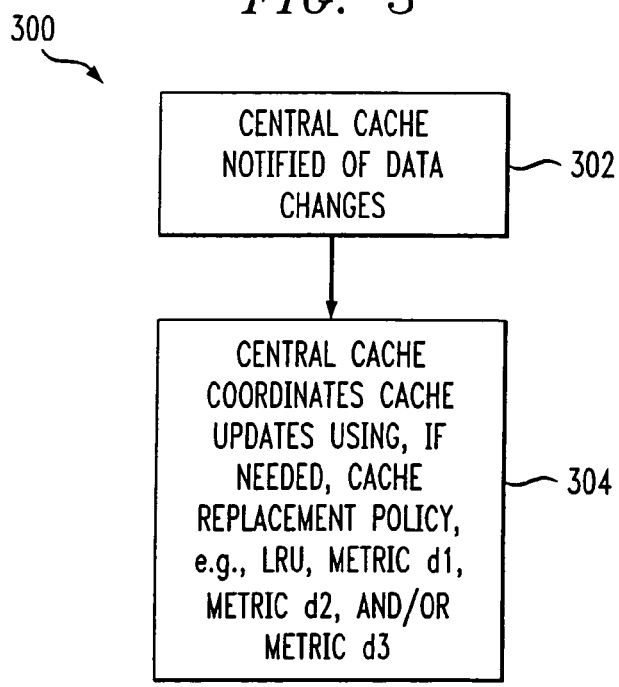

METHODS AND SYSTEMS FOR DISTRIBUTED CACHING IN PRESENCE OF UPDATES AND IN ACCORDANCE WITH HOLDING TIMES

CROSS REFERENCE TO RELATED APPLICATION

This application is a divisional of U.S. application Ser. No. 10/092,766, filed Mar. 7, 2002, now U.S. Pat. No. 6,871,268, the disclosure of which is incorporated by reference herein.

FIELD OF THE INVENTION

The present invention relates to data storage techniques and, more particularly, to techniques for distributed caching in the presence of updates and to techniques for adaptively determining holding times.

BACKGROUND OF THE INVENTION

As is known, the term "cache" generally refers to memory in which data objects are typically stored for faster access. The cache may be on a dedicated data storage device or system accessible by a computing device or system, or the cache may be resident on a computing device or system. For instance, a cache may be implemented as a server in a network (e.g., a cache server or proxy caching server in a World Wide Web or Internet environment) or as an integrated circuit (e.g., a cache either resident on the same integrated circuit as a microprocessor or separate therefrom).

Some of the well-known advantages associated with the use of a cache in such computing environments include the realization of a savings in access and/or processing time, as well as a reduction in data traffic.

A key problem with caching data for efficient performance occurs when multiple processors or computing systems need to share the same cached data. Since data may be changing frequently, cache coherence is essential.

Several solutions have been proposed for caches associated with processors, for example, such as those described in "Computer Architecture: A Quantitative Approach" by J. Hennessy and D. Patterson, 2nd ed., 1996, the disclosure of which is incorporated by reference herein. These schemes typically involve complicated protocols to deal with the fact that multiple processors can both access and update an object.

Other existing techniques include cooperating Web caches, for example, as described in P. Rodriguez, C. Spanner and E. Biersack, "Web Caching Architectures: Hierarchical and Distributed Caching," Proceedings of the 4th International Web Caching Workshop, March 1999, the disclosure of which is incorporated by reference herein. In these situations, the caches might contain stale data, and coordinating consistent updates to caches is extremely difficult.

Another challenge associated with caching and, more generally, with data storage, is that, in many situations, an object needs to be cached, locked or otherwise maintained in a specific state for a certain period of time. For example, suppose that an object o is being accessed by multiple processes, p1, p2, ..., pn. Process p1 would like to perform a series of updates to object o. In order to do so, the process needs to obtain an exclusive lock on the object. However, other processes may need to access object o, including processes that access object o more frequently than process p1. This can cause obvious processing inefficiency problems.

Thus, there is a need for data storage management techniques which address these inefficiency and overhead issues, as well as other related issues.

SUMMARY OF THE INVENTION

The present invention provides techniques for improved cache management including cache replacement. In particular, the invention provides cache management techniques in a distributed environment. The invention also provides techniques for adaptively determining holding times associated with data storage applications such as those involving caches. The invention is applicable to a broad range of applications including, but not limited to, data storage for the World Wide Web. While the invention is particularly applicable to cache-based storage, it can be applied to other forms of data storage as well.

In one aspect, a distributed caching technique of the invention comprises the use of a central cache and one or more local caches. The central cache communicates with the one or more local caches which typically, but not necessarily, reside on processors remote from the central cache. The central cache may coordinate updates to the local caches, including cache replacement. It is to be understood that the term "update," as used herein, is meant not only to include changing the value of a data object in a cache but also may include invalidating the data object or performing some other operation on the object. The central cache may communicate remotely with processes running either on the same processing node or on different processing nodes. That way, several applications running on different processing nodes may communicate with the same cache.

Further, a local cache may exist on the same processing node as an application so that the application may obtain cached data locally. For cached objects, the central cache may keep a directory of which local caches are storing the object. Updates to cached objects may go through the central cache. In order to update a cache object, the central cache may communicate with the local caches to make sure that all copies are invalidated or updated.

When an application tries to obtain cached data, the application first looks for the data in the local cache which is closest. If the object is not in the local cache, the application searches for the object in the central cache. In the event of a central cache miss, the object may be fetched from a remote source.

Furthermore, with respect to the locking or holding time issue, in another aspect, the invention provides techniques for adaptively determining such time values. Thus, the length of time t for which a process p1 holds a lock on an object o is the quantity of interest that the invention determines. The quantity t may depend on a number of factors. If o is being updated frequently by p1, this would suggest that p1 should hold the lock on o for an extended period of time. If o is being accessed frequently by other processes, this would suggest that o should not be held by p1 for a long period of time. Such locking or holding techniques may apply to a distributed caching environment or, more generally, to any data storage environment.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a flow diagram illustrating a method of satisfying a request for an object according to an embodiment of the present invention;

FIG. 3 is a flow diagram illustrating a method of updating cached data according to an embodiment of the present invention;

DETAILED DESCRIPTION OF PREFERRED EMBODIMENTS

While the present invention will be explained below with occasional reference to an illustrative World Wide Web or Internet-based environment, it is to be understood that the present invention is not limited to such a particular environment or application.

Rather, the invention is more generally applicable to any data storage environment or application in which it is desirable to substantially reduce overhead and/or latency associated with updating operations performed in the data storage environment. That is, the techniques of the invention may be applied to any data storage environments such as ones involving disk storage systems or any other persistent memory-based devices such as, for example, ROM (read only memory), fixed memory devices (e.g., hard drive), removable memory devices (e.g., diskette), etc., as well as those involving non-persistent memory-based systems such as, for example, RAM (random access memory), etc.

It is to be understood that, as used herein, the phrase "data object" or "object" is intended to refer to any form of data or information. By way of example only, in the context of the Web, a data object may be some form of Web data such as an HTML (HyperText Markup Language) file, an image file, etc. For example, the data may be objects that are retrieved on the Internet by a server system, or sent to a client computer operatively coupled to a server system via the Internet, in response to a client request. The data may also be objects created at the client's request. However, it is to be understood that the invention is not limited to any particular form of data or information.

Further, it is to be understood that, as used herein, the term "application" is intended to refer to one or more computer programs or computer code that performs, or causes the performance of, one or more functions or processes. By way of example and without limitation, an application may be one associated with bidding in an electronic marketplace or e-marketplace.

Figure 1:
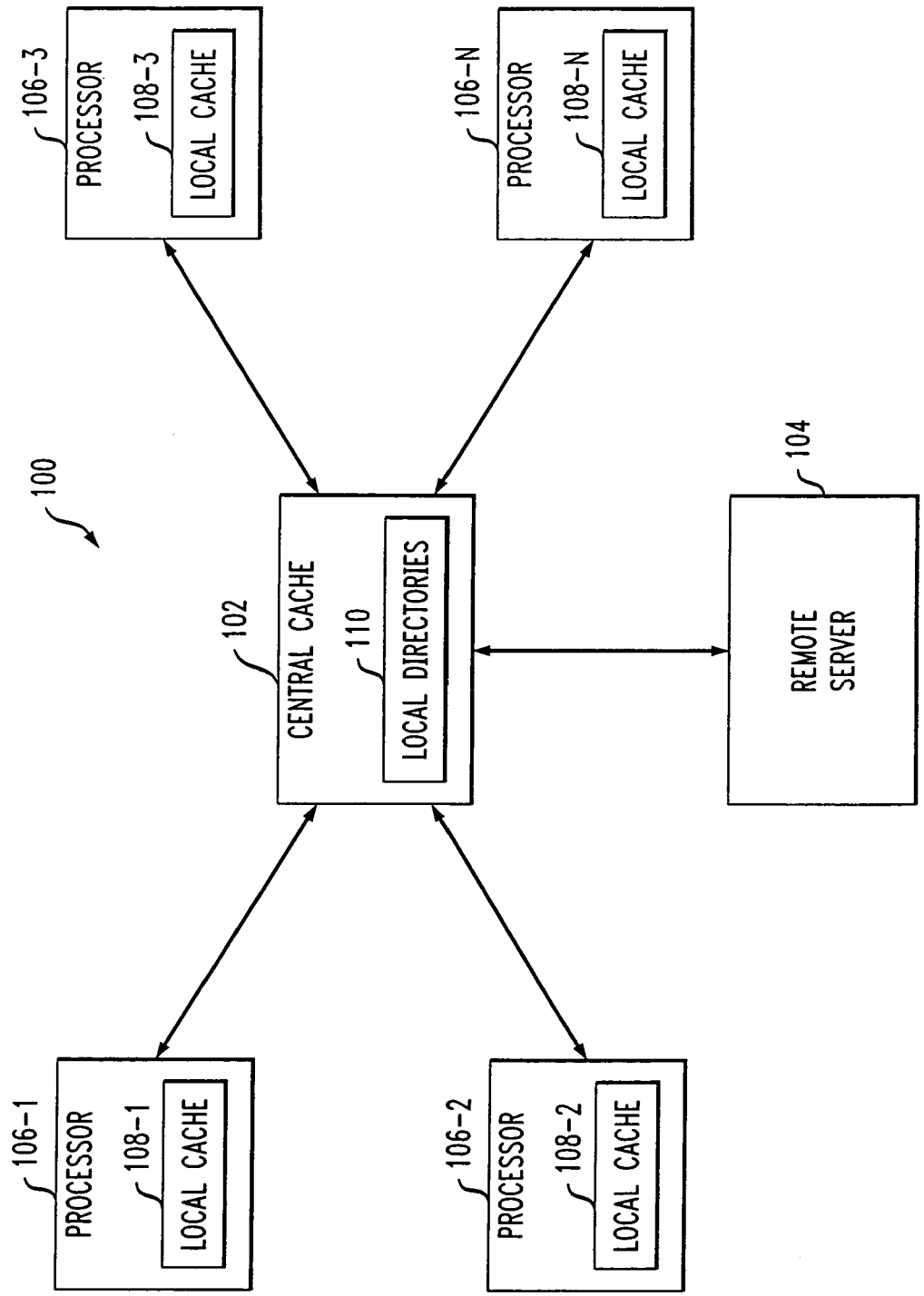
FIG. 1 is a block diagram illustrating a remote distributed caching architecture according to an embodiment of the present invention.

Referring initially to FIG. 1, a block diagram depicts a remote distributed caching architecture according to an embodiment of the present invention. As shown, a system 100 comprises a central cache 102, a remote server 104, and multiple processors 106-1 through 106-N having local caches 108-1 through 108-N respectively associated therewith. All the components may be operatively coupled via a network such as the World Wide Web or Internet.

In general, the central cache 102 stores information from at least one remote server 104. The central cache communicates with a plurality of processors 106 which contain local caches 108. The central cache contains information about what is stored in local caches 108. When cached data changes, the central cache 102 is notified. The central cache is then responsible for updating local caches 108.

A number of variations on FIG. 1 are contemplated to be within the scope of the invention. For example, system 100 may include more than one central cache. Further, there may be multiple local caches associated with a processor. Still further, a local cache may exist on the same processor as the central cache. There may also be multiple remote servers. Communication paths may exist between processors containing local caches. That way, a local cache may query another local cache for data. There may also be communication paths from a remote server directly to a processor containing a local cache. Other variations are contemplated to be within the scope of the invention as well.

Such caches may be used for a wide variety of purposes. One such purpose may be as an application-level cache which has an application programming interface (API) so that software applications can use the caches for improving performance, e.g., as described in "Improving Performance with Application-Level Caching" by L. Degenaro, A. Iyengar, and I. Rouvellou, Proceedings of SSGRR 2001, the disclosure of which is incorporated by reference herein.

If an application is running on a processor remote from the central cache 102, the application may communicate with the central cache in order to obtain data from it. There is some overhead in this remote communication, however. If the application processor has a local cache 108, data can usually be served from the local cache more quickly than from the central cache 102. Since local caches require extra space and may thus in some situations be of limited size, it is preferred to have one or more methods for determining which objects to store in a local cache. Such methods, referred to as cache replacement policies, are described below in accordance with the present invention.

The central cache maintains local directories 110 which indicate the contents of local caches. A local directory maintains information about what objects may, but do not necessarily have to be, cached in the corresponding local cache. These local directories 110 allow a central cache to update local caches.

It is to be understood that in the illustrative embodiment of FIG. 1, each of central cache 102, remote server 104, and the processor 106/local cache 108 combinations may have its own processing/memory capacity for performing steps associated with its operations. For example, the processor 106/local cache 108 combination may be any type of computing device (e.g., personal computer, laptop, personal digital assistant, cellular phone, etc.) with which a client may access data from central caches, other local caches, devices and/or servers to which the client device is coupled. Also, while shown as resident on the processor 106, the local cache 108 need not reside thereon. Further, the remote server 104 may have the processing/memory capabilities of a Web server system. Still further, the central cache 102 may have the processing/memory capabilities of a cache server or proxy caching server.

It is to be appreciated that the term "processor" as used herein is intended to include any processing device or system, such as, for example, one that includes a CPU (central processing unit) or other processing circuitry. Also, the term "processor" may refer to one or more individual processors. Accordingly, one or more computer software programs including instructions or code for performing the cache management methodologies of the invention, as described herein, may be stored in memory associated with the processor (e.g., ROM, fixed or removable memory) and, when ready to be utilized, loaded in part or in whole (e.g., into RAM) and executed by the processor so as to provide one or more of the benefits described herein.

Referring now to FIG. 2, a flow diagram depicts a method 200 of satisfying a request for an object according to an embodiment of the present invention. Reference will be made to the elements depicted in FIG. 1. If the request can be satisfied from a cache, this will incur less overhead than satisfying the request from a remote server.

In step 202, a request for an object is issued. Assume that the request is made by a program executing on a processor 106, referred to as p1, with a local cache 108. This may result, for example, if an application program is trying to obtain data, and the data might be stored in a cache. In step 204, it is determined (e.g., in accordance with processor p1) if the object is in a local cache associated with p1. If so, the request is satisfied from the local cache by returning the object in step 206. In this step, statistics regarding accesses to the object such as those required by a cache replacement algorithm may be updated.

If the object is not in a local cache associated with p1, it is determined in step 208 whether the object is in a central cache, e.g., central cache 102. This determination may be made by in accordance with the processor p1 and/or the central cache 102. If the answer is yes, the object is returned from the central cache in step 210. Statistics regarding accesses to the object such as those required by a cache replacement algorithm may be updated. In addition, the object may also then be stored in a local cache associated with p1 in which case a corresponding local directory, e.g., local directory 110, is updated so the central cache 102 knows about the locally cached copy.

If the object is not in a central cache, the object is fetched from a remote server, e.g., remote server 106, in step 212. The object may also then be stored in the central cache 102 and/or the local cache 108 associated with processor p1. If the object is cached, appropriate directories are updated.

In an alternative embodiment, the object may also be searched for in a local cache associated with a processor other than p1 in response to a cache miss in the local cache associated with p1 or the central cache.

Referring now to FIG. 3, a flow diagram depicts a method 300 of updating cached data according to an embodiment of the present invention. Again, reference will be made to the elements depicted in FIG. 1.

In step 302, data changes, and the central cache is notified of the data changes. Notification may be by way of one or more of the processors 106 informing the central cache of any associated data changes.

In step 304, the central cache coordinates cache updates. That is, the central cache updates all objects it has cached which have changed. In addition, the central cache consults its local directories 110 to see which local caches may contain changed objects. Using local directories, the central cache 102 sends appropriate update messages to local caches. In some cases, a local directory may not be totally accurate, e.g. it might indicate that a local cache c1 contains a cached copy of object o1 when it really does not. If this is the case and c1 receives a message to invalidate o1 because it has changed, c1 simply ignores the message.

In the simplest case, the caches are simply notified that an object o1 has changed. If any of the caches store o1, they then invalidate o1. In other cases, the caches are actually given the new value of o1. In this case, the new value of o1 may be stored in some or all of the caches receiving this new value.

Pre-emptively caching a new version of an object before it is requested is a form of prefetching. While prefetching can reduce the latency the first time an object is accessed, it adds overhead and will not be of benefit unless the object is actually accessed. Statistics on access rates and/or access patterns may be maintained in order to determine objects to prefetch.

Local caches 108 may be of limited size, and it may not be possible to store all objects in a local cache. In this situation, a cache replacement policy is needed to determine which objects should be stored in the cache. The policy may be executed by the central cache.

One commonly used cache replacement policy is known as "least recently used" or LRU. When the cache overflows, LRU evicts the object which was accessed the longest time ago in the past. While LRU is one replacement strategy which can be used in accordance with the invention, others can be used as well.

The present invention provides several new cache replacement algorithms which generally outperform LRU because they maintain more accurate statistics and accommodate a wider range of system bottlenecks.

Cache replacement policy P1 is designed to achieve optimal performance when a central cache is the main system bottleneck. This would be the case when a central cache, e.g., central cache 102, is receiving a large number of requests which are more than it can handle. In order to handle this situation, policy P1 assigns a desirability metric $d_1$ to objects which is proportional to the amount by which caching an object would reduce load on the server divided by the size of the object. For example, in one embodiment, we assign $d_1 = f \cdot c/s$, where f is the frequency with which the object is accessed, c is the cost for the central cache to provide the object, and s is the size of the object. In some cases, c may be proportional to s, so in these situations, $d_1 = f$.

Cache replacement P1 assigns $d_1$ values to objects. When it becomes time to replace an object, the object with the lowest $d_1$ value is removed from the cache. A $d_1$ value may not always be totally current. Values for $d_1$ are typically updated for an object when the object is accessed. Several known data structures (e.g. balanced trees) may be used to maintain $d_1$ values so that the one with the lowest value may be easily identified and removed from the cache.

Cache replacement policy P2 is designed to achieve optimal performance when network bandwidth is the bottleneck. In this case, a value $d_2 = f$ is used, and the algorithm works as described above with $d_2$ substituted for $d_1$.

Cache replacement policy P3 is designed to achieve optimal performance when the primary purpose of the cache is to reduce remote communication latency, and there is not a substantial extra communication overhead for larger objects. In this case, a value $d_3 = f/s$ is used, and the algorithm works as described above with $d_3$ substituted for $d_1$.

Figure 4:
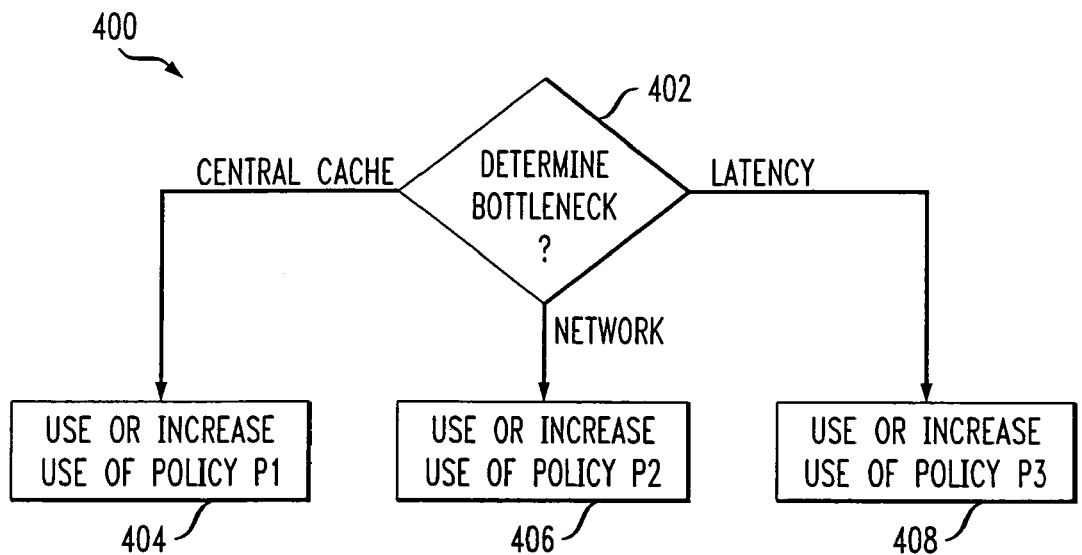
FIG. 4 is a flow diagram illustrating a method of handling cache replacement when the system may have different bottlenecks at different times according to an embodiment of the present invention.

Referring now to FIG. 4, a flow diagram depicts a method 400 of handling cache replacement when the system may have different bottlenecks at different times according to an embodiment of the present invention. Again, reference will be made to the elements depicted in FIG. 1.

Depending on which resource is a bottleneck, a different cache replacement policy is used. Note that different resources may be bottlenecks at different times. The present invention thus provides for using a mix of cache replacement policies. In response to one resource becoming a bottleneck, the fraction of the cache managed by the policy designed to optimize use of the resource is increased.

Thus, as shown in FIG. 4, in step 402, the cause of the bottleneck is determined. Again, this determination may be made by the central cache in accordance with collected system statistics. In the case where a central cache starts becoming a bottleneck, the fraction of the cache managed by policy P1 may be increased in step 404. In the case where the network starts becoming a bottleneck, the fraction of the cache managed by policy P2 may be increased in step 406. In the case where remote communication latency starts becoming a bottleneck, the fraction of the cache managed by policy P3 may be increased in step 408.

Turning now to another issue associated with data object storage such as, for example, may need to be addressed in a remote distributed caching architecture such as in FIG. 1, the present invention also provides techniques for adaptively determining object holding times.

As mentioned above, in many situations, an object needs to be cached, locked, or otherwise maintained in a specific state for a certain period of time. For example, suppose that an object o is being accessed by multiple processes, p1, p2, . . . , pn (e.g., as may be executed by processors 106-1 through 106-N). Process p1 would like to perform a series of updates to o. In order to do so, it needs to obtain an exclusive lock on object o. The length of time t for which p1 holds the lock on object o is the quantity of interest that the invention determines.

The quantity t depends on a number of factors. If object o is being updated frequently by p1, this would suggest that p1 should hold the lock on object o for an extended period of time. If object o is being accessed frequently by other processes, this would suggest that object o should not be held by p1 for a long period of time. Accordingly, the invention adapts the time for holding a lock on object o in response to system conditions.

It is to be appreciated that the invention is applicable to a broad range of problems, not just those associated with locking objects. By way of further example, the invention may also be used to determine how long an object should be kept in a particular location. Also, the invention may also be used to determine for how long statistics should be accumulated.

Assume that process p1 obtains an exclusive lock or hold on object o. While p1 keeps its lock on object o, it may update object o several times. However, p1 may also keep track of the number of requests from other processes to access object o. If the frequency of requests for object o from other processes is high, this will indicate to p1 that it should perhaps give up its lock sooner than it otherwise would.

In a specific illustrative embodiment, when process p1 locks object o, p1 sets a default time, t1, for locking the object. Process p1 also maintain another time interval, t0, which is the maximum time between updates made by p1 before the lock on object o will be released. In other words, the lock on object o will be released by p1 as soon as one of the following happens:

(i) p1 has held the lock for t1 time units.

(ii) p1 has held the lock for at least t0 time units but has not updated object o within the last t0 time units.

This method can be implemented by maintaining two timers. The first timer records the length of time p1 has held the lock on object o. The second timer records the length of time since the last update p1 has made on object o.

If the rate at which object o is updated by p1 is high, t1 may be increased by an amount correlated with the rate. If other processes are requesting object o frequently while object o is locked by p1, either t0 or t1 may be decreased by an amount correlated with the request frequency.

Figure 5:
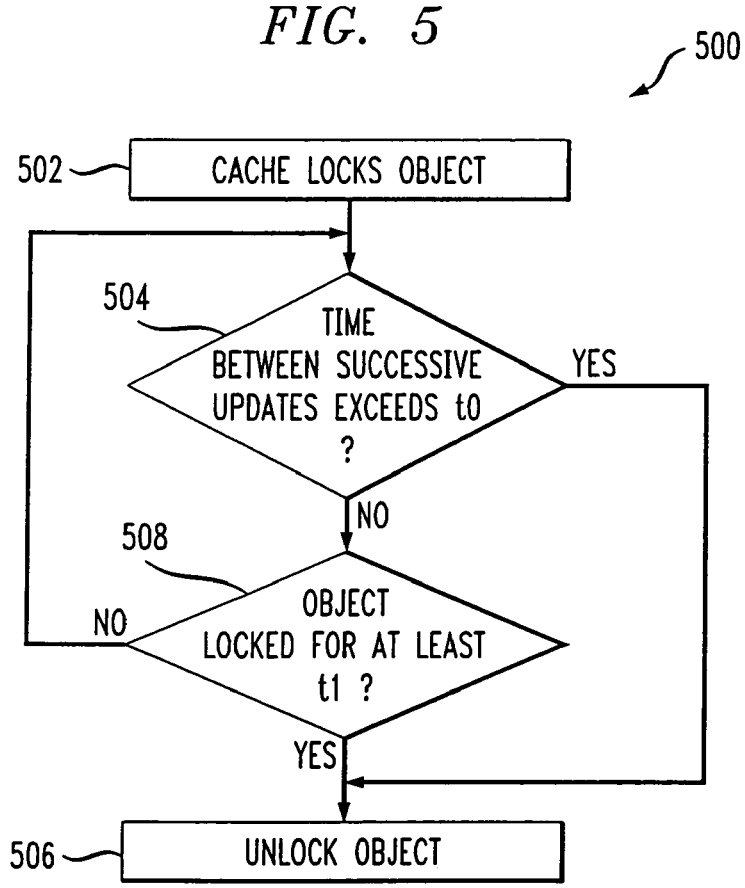
FIG. 5 is a flow diagram illustrating a method of managing locking or holding times associated with data objects according to an embodiment of the present invention.

Referring now to FIG. 5, a flow diagram depicts a method 500 of managing locking or holding times associated with data objects according to an embodiment of the present invention. Again, reference will be made to the elements depicted in FIG. 1.

In step 502, a cache locks an object. The cache may be a central cache (e.g., central cache 102), a local cache (e.g., local cache 108), or some other cache. Further, when it is stated that a cache performs some action, it is to be understood that a processor associated with the cache performs the action, or causes the action to be performed, in accordance with the cache. Also, it is to be understood that the locking time operations described below may be performed by some other processor in the system.

In step 504, the cache determines if the time between successive updates to the object by the cache exceeds a threshold t0 (and the object has been locked for at least t0). If so, the cache releases the lock on the object in step 506. The rationale is that if the cache is not updating the object frequently, it should release its lock so that other processes can access the object. Step 504 comprises one method of determining how frequently the object is updated. Other methods may be applied as well.

In step 508, the cache determines if the object has been locked for at least t1. If so, the cache gives up its lock on the object in step 506. If not, the method returns to step 504.

The holding time determination methodology is adaptive in the following sense. If the rate at which the object is updated is high, t1 may be increased by an amount correlated with the rate. If other processes are requesting the object frequently, either t0 or t1 may be decreased by an amount correlated with the request frequency.

It is to be understood that the methodology of FIG. 5 applies to a system updating an object. The system may lock an object either to update it or to access it without necessarily updating it (e.g., an object read).

Figure 6:
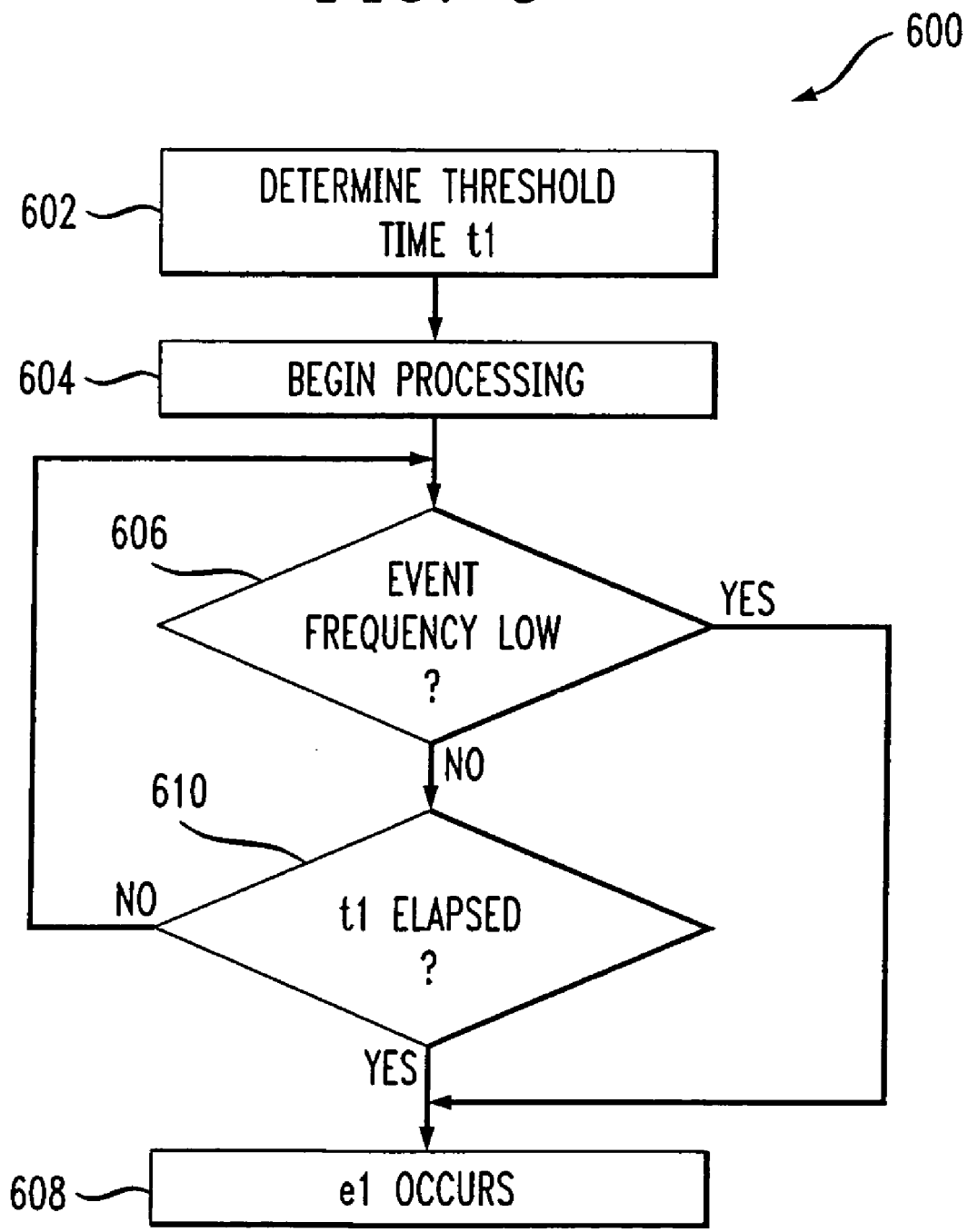
FIG. 6 is a flow diagram illustrating a more generalized data management method according to an embodiment of the present invention.

Referring now to FIG. 6, a flow diagram depicts a more generalized data management method 600 according to an embodiment of the present invention. That is, FIG. 6 depicts a methodology which can be applied to a broad range of problems, such as determining how long an object should be kept in a particular location, how long statistics should be accumulated for, etc. The invention is used to determine when an event e1 should occur. For example, in a specific embodiment, event e1 may be the release of a lock on an object. It is to be understood that the data management operations described below may be performed by some processor in the system.

In step 602, a threshold time t1 is determined which is an upper bound on when the event should occur. As explained above, t1 can be varied.

In step 604, the process for determining when e1 should occur begins. In step 606, it is determined if the frequency of an event occurring (e.g., update of a locked object) is low, e.g., at or below a threshold (such as 0, 1, etc.) It is to be understood that step 504 of FIG. 5 comprises one example of step 606 of FIG. 6, but many others are contemplated as well. If the frequency is determined to be low, event e1 occurs in step 608. Otherwise, processing continues to step 610. If t1 has elapsed, event e1 occurs in step 608. If t1 has not elapsed, the method returns to step 606.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of determining a time for an event to occur in a data storage system, comprising steps of:
   determining, via a processor operatively coupled to the data storage system, a threshold time value t1;
   determining, via the processor, if a frequency of an event occurring in the data storage system is at or below a given frequency value;
   in response to the frequency being at or below the given frequency value, causing, via the processor, the event to occur in the data storage system;
   in response to the event not occurring after t1 has elapsed, causing, via the processor, the event to occur in the data storage system; and
   locking, via the processor, a data object by a process wherein the event comprises unlocking the data object and successive events comprise accesses to the data object by the process.

2. The method of claim 1, further comprising a step of increasing, via the processor, t1 in response to the process accessing the data object at a high rate.

3. The method of claim 1, further comprising the step of decreasing, via the processor, t1 in response to a given number of requests to lock the data object.

4. The method of claim 1, wherein the data object is locked by a cache.

5. A method of determining a time for an event to occur in a data storage system, comprising steps of:
   determining, via a processor operatively coupled to the data storage system, a threshold time value t1;
   determining, via the processor, if a frequency of an event occurring in the data storage system is at or below a given frequency value, wherein the step of determining if the frequency of the event is at or below the given frequency value further comprises determining if a time between successive events one of equals and exceeds a second threshold time value t0;
   in response to the frequency being at or below the given frequency value, causing, via the processor, the event to occur in the data storage system;
   in response to the event not occurring after t1 has elapsed, causing, via the processor, the event to occur in the data storage system;
   locking, via the processor, a data object by a process in which the event comprises unlocking the data object and the successive events comprise updates to the data object by the process; and
   decreasing, via the processor, t0 in response to a given number of requests to lock the data object.

* * * * *